(12) United States Patent
Sakaguchi (10) Patent No.: US 7,283,171 B2
(45) Date of Patent: Oct. 16, 2007

(54) IMAGE PICKUP APPARATUS WITH EXTERNAL DEVICE

(75) Inventor: Norihiro Sakaguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 839 days.

(21) Appl. No.: 10/365,465

(22) Filed: Feb. 13, 2003

(65) Prior Publication Data

US 2003/0174236 A1    Sep. 18, 2003

(30) Foreign Application Priority Data

Mar. 18, 2002  (JP)  ............................. 2002-073784
Nov. 27, 2002  (JP)  ............................. 2002-344311

(51) Int. Cl.
*H04N 5/235* (2006.01)
*H04N 5/238* (2006.01)
*H04N 3/14* (2006.01)
*H04N 5/232* (2006.01)
*G03B 7/00* (2006.01)

(52) U.S. Cl. ................... 348/362; 348/364; 348/230.1; 348/297; 348/350; 396/69; 396/213

(58) Field of Classification Search ..................... None
See application file for complete search history.

(56) References Cited

U.S. PATENT DOCUMENTS 4,335,405 A * 6/1982 Sakane et al. ............... 348/297
4,584,610 A * 4/1986 Mizokami et al. ........ 348/229.1
4,734,777 A * 3/1988 Okino et al. ................. 348/364
4,774,401 A * 9/1988 Yamada et al. .............. 396/122
4,879,600 A * 11/1989 Ise et al. ................... 348/230.1

(Continued)

FOREIGN PATENT DOCUMENTS

JP        63-075628        *   4/1988

(Continued)

OTHER PUBLICATIONS

U.S. Appl. No. 10/365,465, filed Feb. 13, 2003, Sakaguchi.

(Continued)

*Primary Examiner*—David Ometz
*Assistant Examiner*—Nhan T. Tran
(74) *Attorney, Agent, or Firm*—Oblon, Spivak, McClelland, Maier & Neustadt, P.C.

(57) ABSTRACT

An image pickup apparatus including an image pickup device configured to convert a monitored object image into an electrical image signal and to output the image signal, a clock generator configured to generate a constant cyclic drive frequency to drive the image pickup device, and an external device configured to output a brightness signal based on a brightness of the monitored object. Further, a sensitivity to light of the external device is higher than that of the image pickup device. Also included is an image signal reading unit configured to synchronize the image signal with a frequency based on the drive frequency and to read the image signal in a constant read frequency, a brightness signal obtaining unit configured to obtain the brightness signal of the object from the external device, and a read frequency changing unit configured to change the read frequency based on corresponding to the obtained brightness signal.

40 Claims, 5 Drawing Sheets

U.S. PATENT DOCUMENTS

| | | | | |
|---|---|---|---|---|
| 5,128,769 | A * | 7/1992 | Arai et al. | 348/363 |
| 5,302,997 | A * | 4/1994 | Cocca | 396/111 |
| 5,517,243 | A * | 5/1996 | Kudo et al. | 348/296 |
| 5,534,916 | A | 7/1996 | Sakaguchi | |
| 5,774,623 | A | 6/1998 | Maeda et al. | |
| 6,075,562 | A * | 6/2000 | Sakaguchi et al. | 348/362 |
| 6,654,062 | B1 * | 11/2003 | Numata et al. | 348/362 |
| 6,943,837 | B1 * | 9/2005 | Booth, Jr. | 348/296 |
| 7,071,987 | B1 * | 7/2006 | Tanaka | 348/362 |

FOREIGN PATENT DOCUMENTS

| | | |
|---|---|---|
| JP | 2001-057645 | 2/2001 |
| JP | 2001-128056 | 5/2001 |

OTHER PUBLICATIONS

U.S. Appl. No. 10/761,329, filed Jan. 22, 2004, Sakaguchi.
U.S. Appl. No. 10/235,715, filed Sep. 6, 2002, pending.

* cited by examiner

IMAGE PICKUP APPARATUS WITH EXTERNAL DEVICE

BACKGROUND OF THE INVENTION

1. Field of the Invention

The present invention relates to an image display that changes read-out speeds of image signals according to a brightness of an object.

2. Description of the Related Art

A digital camera includes a charge-coupled device (CCD) as an image pickup device and an external ranging device used to control a focus of the image pickup device (e.g., an automatic focus (AF)). The focus may also be controlled using output signals directly from the CCD without using the external ranging device.

Japanese Laid-open patent application 2001-057645 (JP '645) is related to the present invention and is incorporated in its entirety. JP '645 is directed to a fine focus control method that can be executed in a low brightness environment based on an image signal so as to prevent the resolution of the image from deteriorating. JP '645 discloses a digital camera with a focus control function including a focus lens, an image pickup device and an AF processing circuit. The focus lens forms an image of an object on an image pickup display. Further, the image pickup device converts the object image formed by the focus lens into an image signal. The AF processing circuit then controls a focal point of the focus lens based on the image signal from the image pickup device. Further, the disclosed digital camera uses the image signal directly during the focus control process when the brightness of the object is adequately high. When the brightness of the object is relatively low, the camera adds an image signal corresponding to an electric charge of pixels neighboring in a vertical direction to the image signal used during the focus control process. Further, the image signal is then amplified by an automatic gain control circuit (AGC) after the electric charges are added for the low brightness environment.

Another related invention is disclosed in Japanese Laid-open patent application 2001-128056 (JP '056), which is also incorporated in its entirety. JP '056 is directed to detecting a position having an adequate brightness to execute the AF processing when a reflected light cannot be detected due to the darkness of an object and the illumination of a fill light. In JP '056, the camera includes an object brightness detecting unit, a fill light illuminating unit, an AF detection area determining unit, a focus condition calculating unit, and a lens driving unit. The object brightness detecting unit detects a brightness of a predetermined area in the object, and the fill light illuminating unit illuminates a fill light to the object when the detected object brightness is equal to or lower than a reference value. Further, the AF detection area determining unit determines an area where a signal level of the reflected light obtained through illuminating the object is equal to or higher than a predetermined value as a detection area for AF within areas where the brightness is detected by the object brightness detecting unit. The focus condition calculating unit calculates a focus condition based on an output from the detection area for the determined AF, and the lens driving unit drives the lens based on an output from the focus condition calculating unit.

Generally, the sensitivity of the external ranging device to light is higher than that of the CCD. Accordingly, although it is impossible for a user to accurately see what is reflected as an object image in a monitor because of darkness when the storage time of the CCD/30 is driven at usual speed of 1/30 seconds, an output signal of the external ranging device may still be used to calculate a suitable auto focus. In other words, while the AF operation is executed, the monitor screen may be substantially dark.

When the AF process is executed without using the external ranging device, the range of the AF and brightness of a display are substantially the same. Further, because the sensitivity of the CCD is lower than that of the user, the user cannot adequately recognize the object on the display.

To solve this problem, an extension of the storage time of the CCD is effective assuming that the sensitivity of the CCD is constant. It is, however, difficult to precisely operate AF because of an object moving or becoming blurred during the AF process using the output signals directly from the CCD, even though the storage time of the CCD is extended (e.g., 1 second) and the object can be clearly reflected in the display.

SUMMARY OF THE INVENTION

Accordingly, one object of the present invention is to solve the above-noted and other problems.

Another object of the present invention is to provide an image pickup device which displays a focused monitoring image in dark surroundings.

To achieve these and other objects, the present invention provides an image pickup apparatus including an image pickup device configured to convert a monitored object image into an electrical image signal and to output the image signal, a clock generator configured to generate a constant cyclic drive frequency to drive the image pickup device, and an external device configured to output a brightness signal based on a brightness of the monitored object. Further, a sensitivity to light of the external device is higher than that of the image pickup device. Also included is an image signal reading unit configured to synchronize the image signal with a frequency based on the drive frequency and to read the image signal in a constant read frequency, a brightness signal obtaining unit configured to obtain the brightness signal of the object from the external device, and a read frequency changing unit configured to change the read frequency based on corresponding to the obtained brightness signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
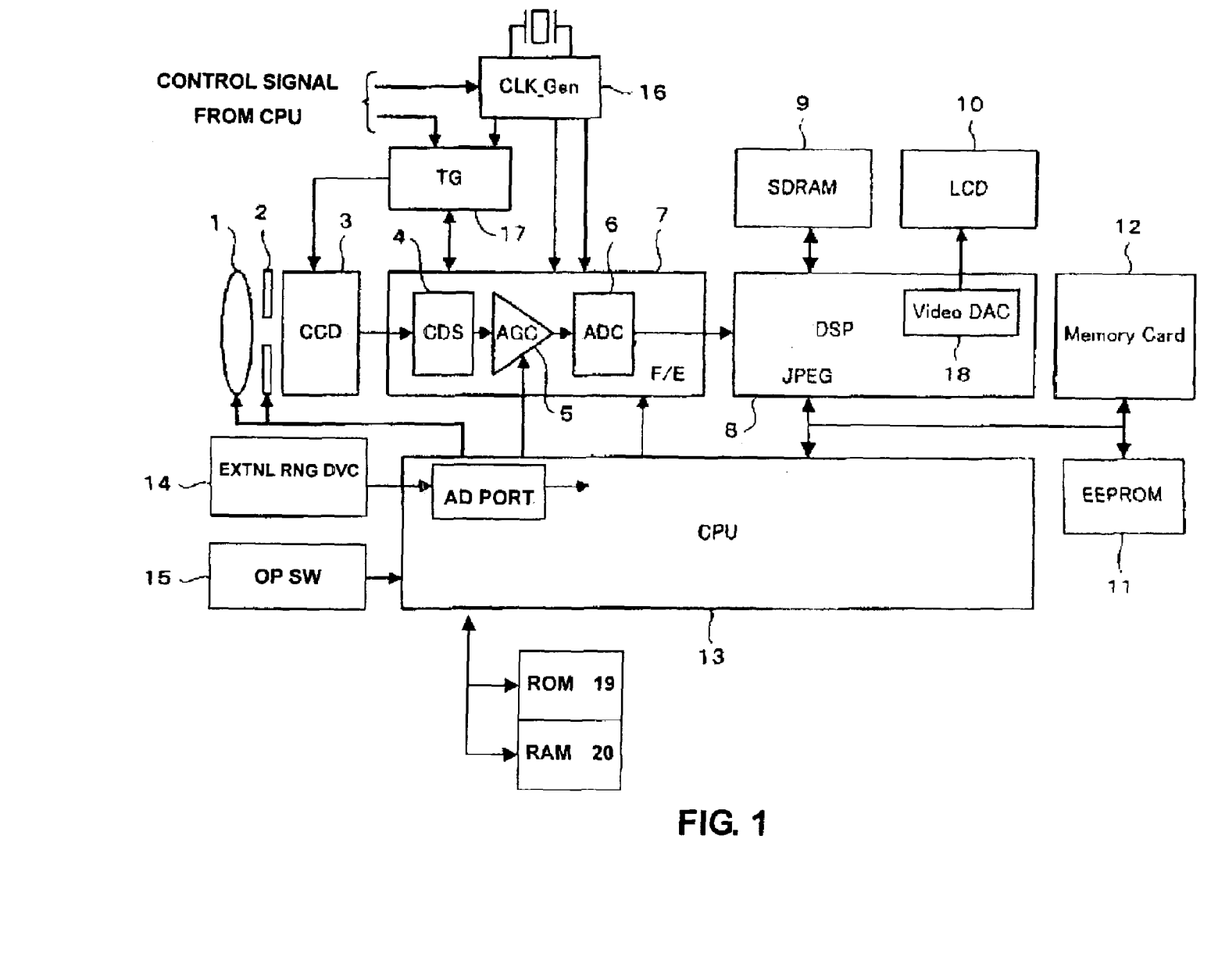
FIG. 1 is a schematic diagram of a digital still camera of the present invention.

Referring now to the drawings, wherein like reference numerals designate identical or corresponding parts throughout the several view, the present invention will be described. First, FIG. 1 is an example of an image pickup apparatus of a digital still camera according to the present invention. As shown, the digital still camera includes a lens 1, an aperture 2, a CCD 3 as an image pickup device, a corration double sampling circuit (CDS) 4, an AGC 5, an analog digital converter (ADC) 6, a front end (F/E) 7, a digital signal processor (DSP) 8, a synchronous dynamic random access memory (SDRAM) 9, a liquid crystal display device (LCD) 10, an electrically erasable progammable read-only memory (EEPROM) 11, a memory card 12, a central processing unit (CPU) 13, an external ranging device 14 for AF, an operating switch 15, a clock generator (CLK Gen) 16, and a timing generator (TG) 17.

An image pickup unit includes the lens 1, the aperture 2 and the CCD 3, and the F/E 7 includes the CDS 4, the AGC 5 and the ADC 6. The CDS 4 removes noise, etc., from an output signal from the CCD 3. Further, the DSP 8 is a signal processing unit for signal processing, and the SDRAM 9 is a memory used to record or reproduce data processed by the DSP 8 or raw data from the ADC 6. The LCD is a display unit that displays a monitoring image, a reproducing image, and variety of information etc. The EEPROM 11 stores data concerning an adjustment value etc., and the CLK Gen 16 is a clock generator. The external ranging device 14 may also perform functions other than the AF function.

In addition, the DSP 8 includes a digital analog converter (DAC) 18. A control program for the CPU 13 is also stored in the ROM 19. When the power of the digital still camera is turned on, the control program is loaded from the ROM 19 into a main memory in the CPU 13. The CPU 13 controls an operation for each memory block according to the control program and saves data as necessary for temporarily controlling the memory blocks in the RAM 20.

Further, the TG 17 generates pulses to drive the CCD 3 based on clocks from the CLK Gen 16. The generated pulses are input to the CCD 3 and synchronized between the DSP 8 and the image pickup apparatus. The CLK Gen 16 includes a multiplexer and supplies the DSP 8 with system clocks, clocks for a universal serial bus (USB) etc., and changes output frequencies based on control signals from the CPU 13.

In addition, the DSP 8 generates evaluation values for the AF process, an automatic exposure control (AE) process, and a white balance control process etc. An example of an evaluation value for the AF is an integrated value for each image frequency component. The CPU 13 also has a function for calculating the evaluation values for the AF, the AE etc. of the DSP 8, and sets parameters for the DSP 8, the F/E 7 etc. The CPU 13 also processes input signals from the operating switch 15 operated by a user taking a photograph.

The CCD 3 is driven by the pulses from the TG 17, and detects incident light coming from an object through the lens 1 and the aperture 2 thereby receiving an image. The CCD 3 converts the received light into electronic signals (electric charges). As noted above, the CDS 4 removes noise from the output electric signals and inputs the modified signals to the AGC 5. Further, the AGC 5 controls the gain of the input signals and inputs the resultant signals to the ADC 6, which converts the signals into digital signals. The DSP 8 then stores raw data received from the ADC 6 directly in the SDRAM 9.

In a usual still image process, the DSP 8 reads the raw data from the SDRAM 9 and generates brightness signals and color signals based on the raw data. The DSP 8 then records the brightness signals and color signals in the memory card 12 based on a process of the joint photographic experts group (JPEG). The DSP 8 also converts the raw data from the CCD 3 into red, green and blue (RGB) signals for display or YUV (brightness signals and color-difference signals) signals.

Further, the DAC 18 converts the converted signals into analog video signals and outputs the analog video signals to the LCD 10, which displays object images based on the input video signals. When the LCD 10 displays information such as a distance to the object, the CPU 13 plots the distance using the SDRAM 9 via the DSP 8 and superimposes the plotted signals on the video signals in the DSP 8 and displays the plotted signals on the LCD 10.

The external ranging device 14 outputs analog signals corresponding to a reciprocal number 1/L of the distance L to the object to the CPU 13 after detecting light from the object. The CPU 13 receives the analog signals from the external ranging device 14 through an AD port and converts the analog signals into digital signals. The CPU 13 then appropriately moves the lens 1 corresponding to the distance to the object based on the digital signals and executes the AF.

Further, a property of light sensitivities of the external ranging device 14 for the AF is generally higher than that of image pickup devices such as the CCD. Light exposure limitations on the low side for brightness are assumed to be the Exposure Value (EV) 1 for the external ranging device 14 and EV 4 for the CCD 3. Based on this assumption, proper image outputs can not be obtained between EV1 and EV 4 while the AF operation is performed. Alternatively, the EV for the external ranging device 14 and/or the CCD 3 may be a different value from EV 1 and EV 4.

When an object is between EV 1 and EV 4 and the CCD 3 can not measure the brightness as discussed above, the CPU 13 measures output levels from the external ranging device 14 and obtains light exposures for the external ranging device 14 corresponding to the brightness of the object. Then, the CPU 13 obtains pertinent image outputs corresponding to the light exposures (i.e., exposure values). An example of obtaining light exposures for the external ranging device 14 corresponding to a brightness of the object is as follows. A photo acceptance unit (not shown) in the external ranging device 14 detects light from the object and converts the light into electronic signals. The CPU 13 then measures levels (amplitude values) of the electronic signals and obtains light exposures for the external ranging device 14 corresponding to the measured levels (amplitude values). Alternatively, the EV for the external ranging device 14 and/or the CCD 3 may be a different value from EV 1 and EV 4.

Figure 2A:
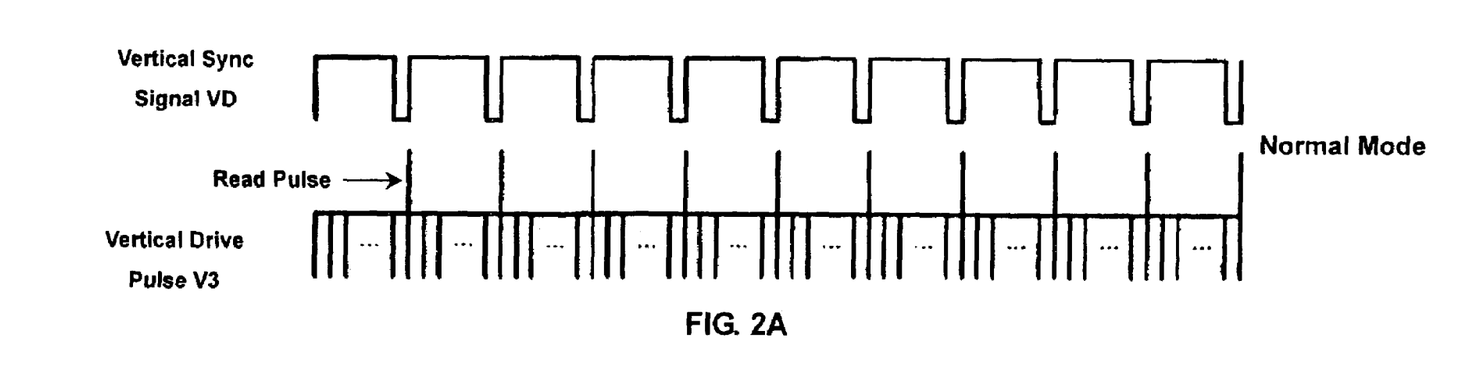
FIGS. 2A and 2B are examples of a timing chart of driving signals for the CCD shown in FIG. 1.
Figure 2B:
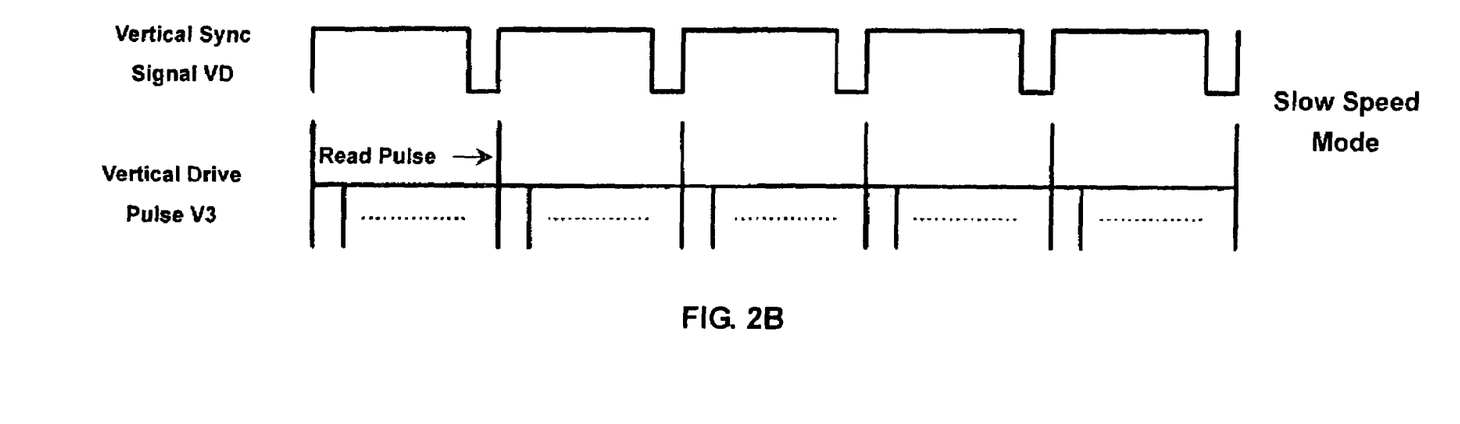
Figure 3A:
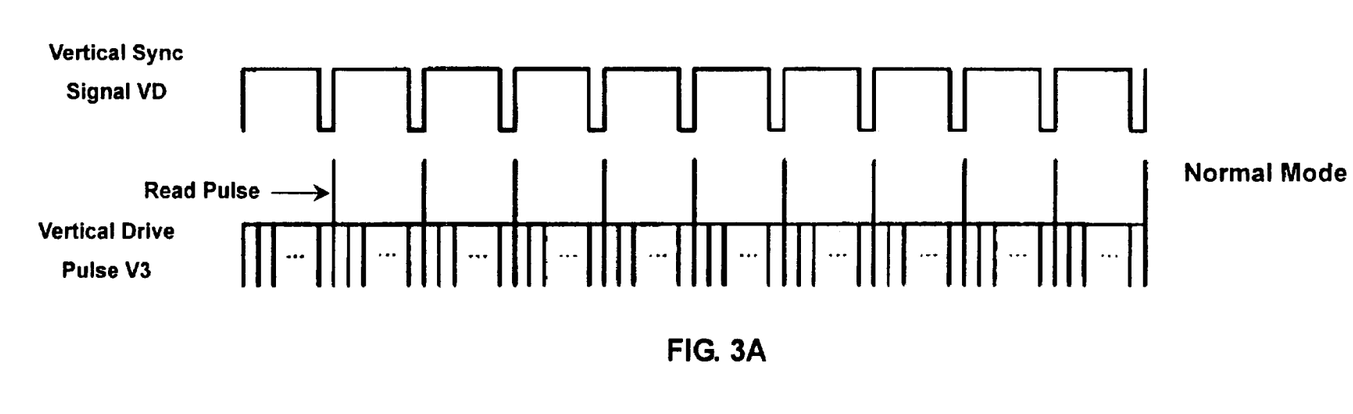
FIGS. 3A and 3B are other examples of a timing chart of driving signals for the CCD shown in FIG. 1.
Figure 3B:
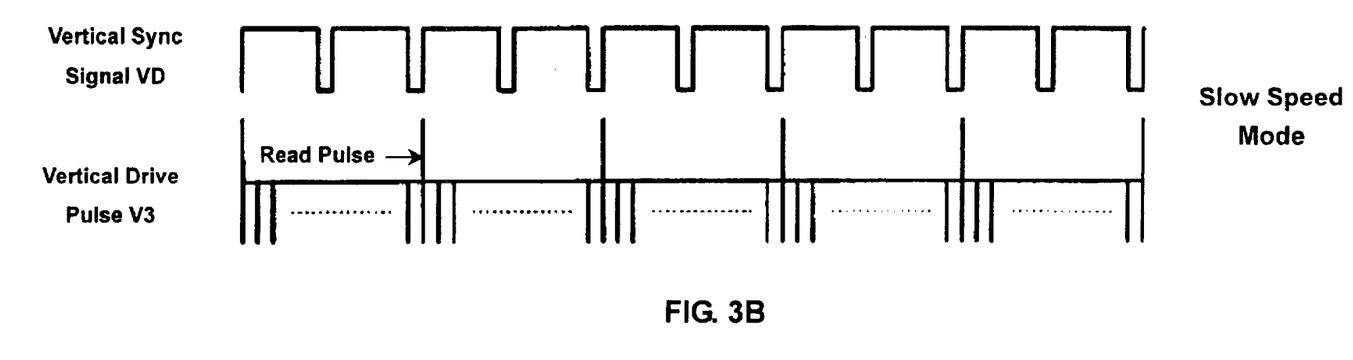
Figure 4:
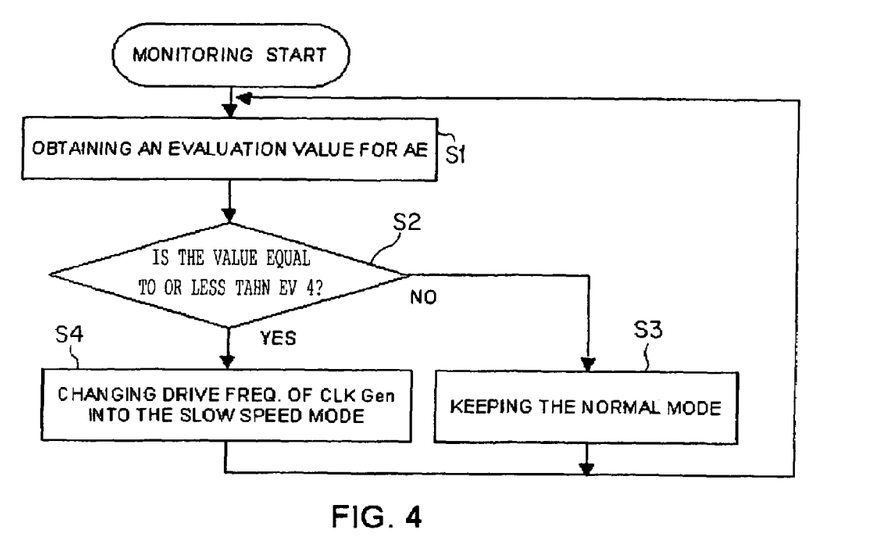
FIG. 4 is a flowchart for a changing operation of driving frequencies of the CCD shown in FIG. 1.

Turning now to FIGS. 2A, 2B, 3A, 3B and 4, which are used to explain vertically driving the CCD 3 according to the present invention. As shown in FIG. 4, the CPU 13 obtains the evaluation value for the AE from the DSP 8 (step S1) and determines whether light exposures for the CCD 3 are equal to or less than EV 4 (NO in step S2). When the light exposures for the CCD 3 are not equal to or less than EV 4 (NO in step S2), the CPU 13 sets the vertical sync signal VD and the vertical drive pulse V3 to a normal condition (see FIG. 2A) and sets the drive frequency of the CCD 3 to a normal operating mode (step S3). The vertical sync signal VD and the vertical drive pulse are input into the CCD 3 from the TG 17 corresponding to a clock frequency from the CLK Gen 16.

Accordingly, the frequencies of the vertical sync signal VD and the vertical drive pulse V3 are the drive frequencies of the CCD 3 (i.e., the frequencies of drive signals output from the TG 17 based on clocks input into the TG 17 from the CLK Gen 16). Further, a frequency of the read pulses for reading the electronic signals is synchronized with the frequency of the vertical sync signal VD in this instance. Thus, one cycle of the vertical sync signal VD corresponds to one cycle of the read pulse. As shown in FIG. 2A, n (n=a predetermined positive integer) times the cycle of the vertical drive pulse V3 coincides with one cycle of the read pulse.

In addition, when light exposures for the CCD 3 is equal to or less than EV 4 (YES in step S2), the CPU 13 controls the CLK Gen 16 and changes the frequency of the clock input into the TG 17 from the CLK Gen 16 into a predetermined frequency less than the normal condition corresponding to light exposures for brightness of an object (step S4), which is obtained by the external ranging device 14. Accordingly, the CPU 13 changes the vertical sync signal VD and the read pulse on the vertical drive pulse V3 into a predetermined frequency less than the normal condition as shown in FIG. 2B. In other words, the CPU 13 changes the drive frequency of the CCD 3 into a slow speed mode based on the sensitivity property (output) for the external ranging device 14.

In this instance, the CPU 13 reduces the frequency of the vertical sync signal VD in half corresponding to a brightness of the object as shown in FIG. 2B. Further, because the frequency of the read pulse is synchronized with the vertical sync signal VD, one cycle of the vertical sync signal coincides with one cycle of the read pulse for reading the electronic signal. As shown in FIG. 2B, 2n (n=predetermined positive integer) times the cycle of the vertical drive pulse, however, coincides with one cycle of the read pulse.

Alternatively, the CPU 13 may change the drive frequency of the CCD 3 into plural frequencies according to sensitivity properties (output levels) of the external ranging device 14. For example, the CPU 13 may turn the drive frequency of the CCD 3 down in stages according to changing of the light exposures into EV 3, EV 2, EV 1 measured by the external ranging device 14. Additionally, the CPU 13 may control the TG 17 directly and change the drive frequency of the CCD 3.

Because the CPU 13 changes the drive frequency of the CCD 3 according to sensitivity properties (output levels) of the external ranging device 14, an appropriate monitoring image can be output even in a dark surrounding where the CCD 3 can not detect adequate light exposures. If the CPU 13 can adjust the focus of an object with low brightness using output signals from the external ranging device 14 (i.e., the CPU 13 can measure a distance and detect a light exposure using the external ranging device 14), the CPU 13 sets the drive frequency of the CCD 3 on the slow speed mode. The CPU 13, then, can output an appropriate and focused monitoring image in a dark surrounding. Additionally, consumption of power is saved during the slow speed mode.

Alternatively, if light exposures for the CCD 3 is equal to or less than EV 4, the CPU 13 may not control the CLK Gen 16 and set the clock frequency from the CLK Gen 16 to the TG 17 to be normal. The CPU 13, however, controls the TG 17 corresponding to light exposures based on output levels obtained by the external ranging device 14 according to the brightness of the object. In the slow speed mode, the CPU 13 then extends the intervals of the read pulse as compared to the normal mode as shown in FIGS. 3A and 3B.

The CPU 13 executes mask processes to read pulses of a predetermined interval generated from the TG 17 as an example of extending a read pulse interval. As a result, a storage time of electric charges is longer than the normal mode and the same effect as FIG. 2B is obtained. In a normal mode, the CPU 13 coincides one cycle of the vertical sync signal VD based on the drive frequency of the CCD 3 with one cycle of a read pulse for reading the electronic signal (electric charge). In the slow speed mode, the CPU 13 synchronizes two cycles of the vertical sync signal VD with one cycle of the read pulse frequency. As shown in FIG. 3B, 2n (n=predetermined positive integer) times the cycle of the vertical drive pulse coincides with one cycle of the read pulse.

Because the CPU 13 lowers the read pulse frequency (i.e., the CPU 13 extends a cycle or an interval of the read pulse) and increases the storage time of electric charges for the CCD 3 according to sensitivity properties (output levels) of the external ranging device 14, an appropriate monitoring image can be output in a dark surrounding. If the CPU 13 can adjust a focus of an object with low brightness using output signals from the external ranging device 14 (i.e., the CPU 13 can measure a distance and detect a light exposure using the external ranging device 14), the CPU 13 extends the storage time of the electric charge to the slow speed mode. The CPU 13, then, can output an appropriate and focused monitoring image in a dark surrounding. Additionally, because a frequency variable clock generator is unnecessary as the CLK Gen 16, a circuit structure can be simple.

In FIGS. 2A, 2B, 3A and 3B, the vertical drive pulse V3 shows a three-value pulse V3 in a four-phase drive, V1 to V4, as an example. However, another three-value pulse V1 may be used, which operates the same as V3 except for a change of its phase. Pulses V2 and V4 are two-value pulses without a read pulse and are driven with phases different than other pulses.

Figure 5:
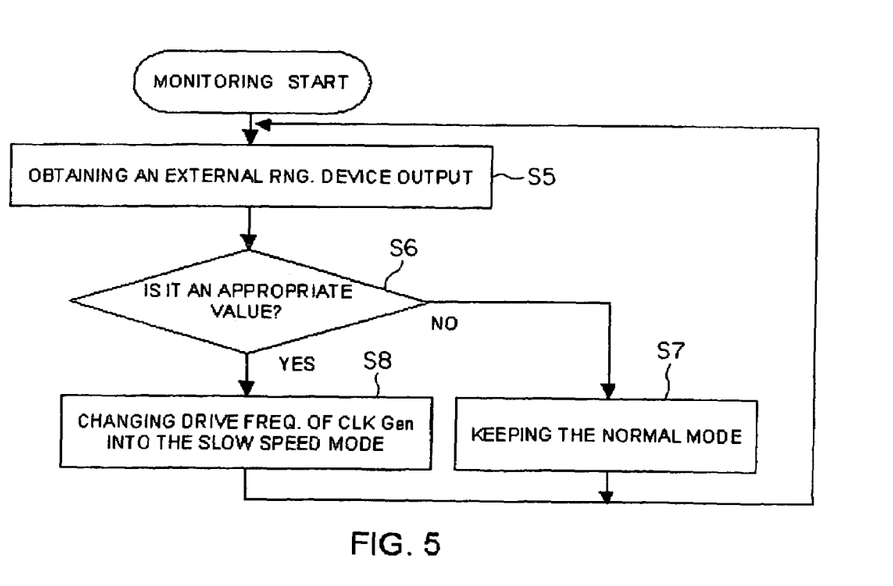
FIG. 5 is another flowchart for a changing operation of driving frequencies of the CCD shown in FIG. 1.

In addition, with regard to FIG. 5, instead of determining the evaluation value for the AE from the DSP 8 as described with respect to step S1 in FIG. 4, the CPU 13 may determine this value based on a level of an output signal from the external ranging device 14 (step S5). In other words, the CPU 13 determines whether the output signal from the external device 14 is an appropriate level and then determines whether the light exposure for the CCD 3 is equal to or less than EV 4 indicating a lower side brightness value (step S6). If the output level is an appropriate value (YES in step S6), the CPU 13 changes the drive frequency of the CLK Gen 16 into the slow speed mode (step S8). Otherwise, (NO in step S6), the normal mode is maintained. Further, a table of the light exposures for the CCD 3 corresponding to premeasured output signal levels of the external ranging device 14 may be stored in the ROM 19. In this instance, the CPU 13 obtains an output signal level from the external ranging device 14, and the CPU 13 estimates a light exposure for the CCD 3 by reference to the table in the ROM 19.

Accordingly, the CPU 13 determines whether the light exposure for the CCD 3 is equal to or less than EV 4. Alternatively, the ROM 19 may have a relational expression between the output signal levels (light exposures) of the external ranging device 14 and the light exposures for the CCD 3. In this instance, the CPU 13 sets an output level obtained by the external ranging device 14 in the relational expression and solves for the light exposure for the CCD 3. Thus, the CPU 13 can obtain appropriate image outputs up until a limitation of focusable brightness without reference to fluctuations of the sensitivity of the external ranging device 14.

The external ranging device 14, generally, is suitable for an object having frequencies changing in the horizontal direction (i.e., a vertical-striped contrast object). The external ranging device 14, however, may err from a normal operation for an object with contrast only in the vertical direction or with little contrast. To cover for this type of error, the above-described two methods may be used simultaneously. That is, one method is the determination of the CPU 13 using the evaluation value for the AE from the DSP 8, and the other method is the determination of the CPU 13 using the output signal level of the external ranging device 14. If the CPU 13 determines the light exposure is equal to or less than EV 4 using at least one of these methods, the CPU 13 sets the slow speed mode.

Further, it is difficult to precisely maintain a constant image output level by only changing the drive frequency of the CCD 3 or an interval of the read pulse (storage time of electric charge). It is possible to solve this difficulty by increasing varieties of variable drive frequencies of the CCD 3. However, a circuit size of the CLK Gen 16 increases in this solution. Alternatively, an electronic shutter may be used as another solution. In more detail, in the slow speed mode as above-mentioned, the CPU 13 may adjust video signal levels using the electronic shutter in the range until the light exposure for the CCD 3 reaches an appropriate exposure value.

The electronic shutter is included in the CCD 3, and receives electronic shutter pulses corresponding to the read pulse frequency from the TG 17. In addition, the electronic shutter then removes electric charges from all solarization pixels in an acceptance surface of the CCD 3 to ground through a substrate in a semiconductor of the CCD 3. The CPU 13 controls the TG 17 and the electronic shutter pulse input to the CCD 3 corresponding to a change of the read pulse frequency to maintain a constant video signal level. Because the CPU 13 adjusts video signal levels using the electronic shutter in the range until the light exposure for the CCD 3 reaches an appropriate exposure value, the image signal level is precisely maintained at a constant value.

In the slow speed mode as above-mentioned, the CPU 13 controls the AGC 5 corresponding to the read pulse frequency to maintain a constant video signal level and adjusts video signal levels in the range until the light exposure for the CCD 3 reaches an appropriate exposure value. Because the CPU 13 adjusts the video signal levels by the AGC 5 in the range until the light exposure for the CCD 3 reaches an appropriate exposure value, the image signal level is precisely maintained constant.

When the CPU 13 changes to the slow speed mode the image is displayed at a slower speed. Thus, the user has to hold the camera for a longer period of time, which may result in the user inadvertently slightly moving or jiggling the camera. Accordingly, an image pickup apparatus may have an operation unit for setting a low brightness object mode differing from a normal shooting mode in the operating switch 15. The CPU 13, then, changes to the slow speed mode only in the low brightness object mode by an input signal from the operation unit. Because the image pickup apparatus has a mode of changing a storage time of electric charges in the CCD 3 and the user can set this mode, a hand waggle without the user's intention can be effectively prevented.

Figure 6:
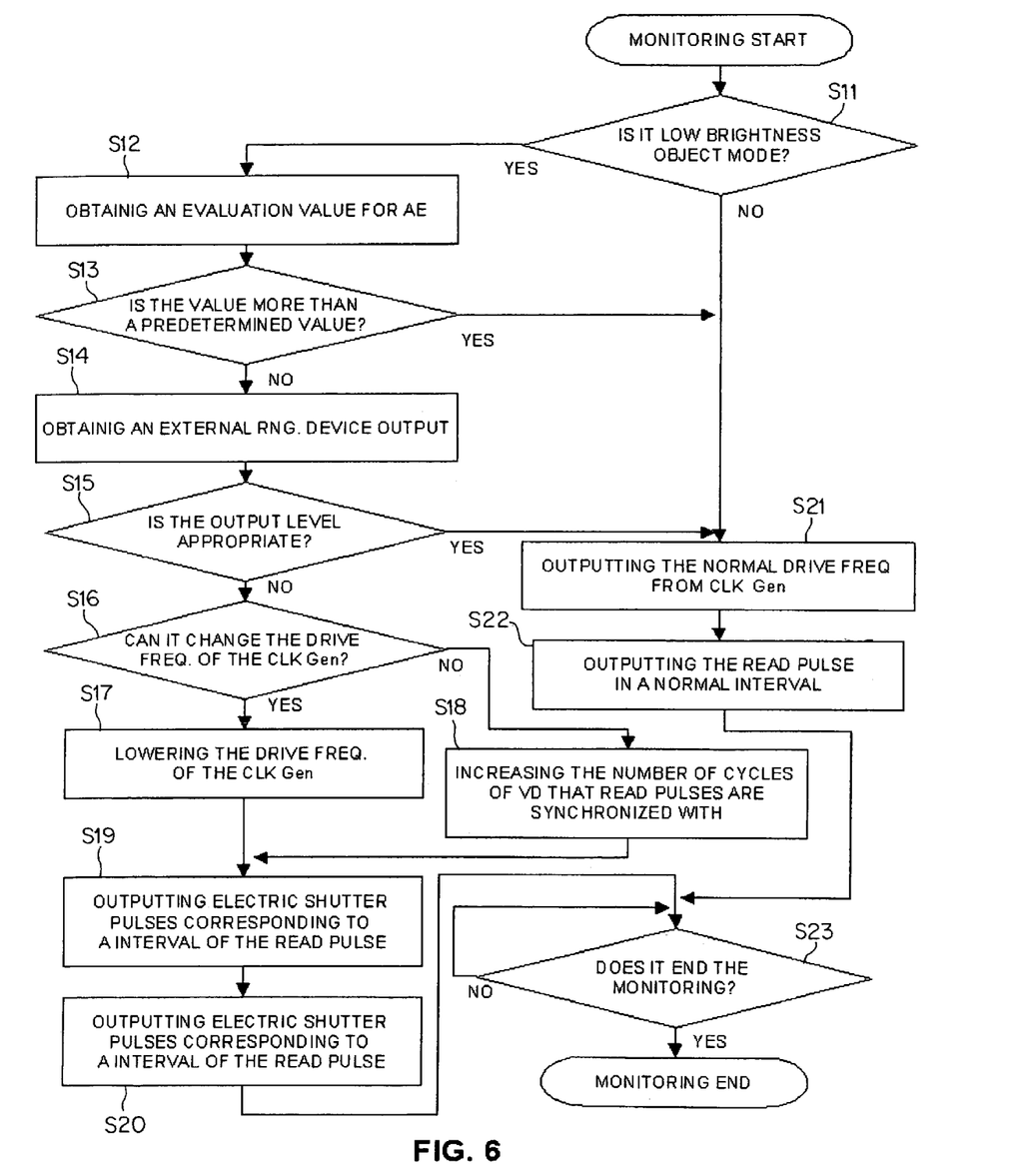
FIG. 6 is a flowchart illustrating a monitoring process of the present invention.

Turning now to FIG. 6, which shows an example of a flowchart for a monitoring process of the above-mentioned digital still camera. The CPU 13 executes the operations shown in the flowchart according to a control program stored in the ROM 19. After the monitoring process starts, the CPU 15 determines whether the digital camera has been set to the low brightness object mode via the user operating the operating switch 15 (step S11).

If the digital camera is not set in the low brightness object mode (NO in step S11), the CPU 13 controls the CLK Gen 16 and generates a normal drive frequency of the CCD 3 (step S21). The CPU then generates a read pulse for reading electronic signals with a normal frequency based on the normal drive frequency and reads the electronic signals (step S22). In this instance, the CPU 13 also prohibits a read frequency from being changed If the digital camera is set in the low brightness object mode (YES in step S11), the CPU 13 obtains the evaluation value for the AE (the light exposure, the exposure value etc.) (step S12). The CPU 13 also function as a light exposure obtaining unit. The CPU 13 then determines whether the obtained evaluation value for the AE is more than a predetermined value such as EV 4 (step S13). If the CPU 13 determines that the obtained evaluation value for the AE is more than a predetermined value (YES in step S13), the CPU 13 executes the process of the above-mentioned steps S21 and S22, because the brightness of the object is adequately high.

If the CPU 13 determines that the obtained evaluation value for the AE is equal to or less than a predetermined value (NO in step S13), the CPU 13 obtains an output level of the external ranging device 14 (step S14). The CPU 13 obtains a light exposure of the external ranging device 14 corresponding to the brightness of the object by the output level. The CPU 13 also functions as a brightness signal obtaining unit. The CPU 13 then determines whether the obtained output level is an appropriate level such as the level corresponding to an exposure value which is more than EV 4 for the CCD 3 using the table or the expression stored in the ROM 19 (step S15). If the CPU 13 determines that the obtained output level is an appropriate level (YES in step S15), the CPU 13 executes the process of the above-mentioned steps S21 and S22, because the brightness of the object is adequately high.

If the CPU 13 determines that the obtained output level is not an appropriate level (NO in step S22), the CPU 13 determines whether the drive frequency of the CCD 3 can be lowered by a frequency from the CLK Gen 16 (step S16). The CPU 13 may make this determination based on whether or not information is set by the user or a manufacturer and/or based on whether or not the CLK Gen 16 has a frequency changing circuit.

If the CPU 13 determines that the drive frequency of the CCD 3 can be lowered (YES in step S16), the CPU 13 changes the frequency from the CLK Gen 16 corresponding to the obtained output level of the external ranging device 14 and lowers the drive frequency of the CCD 3 (step S17). Accordingly, the CPU 13 lowers the frequency of the read pulse in proportion to the drive frequency of the CCD 3. The CPU 13 may also control the TG 17 directly corresponding to the obtained output level of the external ranging device 14 and lower the drive frequency of the CCD 3. If the CPU 13 can not determine the output level of the external ranging device 14 due to an excessively small level, the CPU 13 sets the drive frequency of the CCD 3 to the lowest possible frequency.

If the CPU 13 determines that the drive frequency of the CCD 3 can not be lowered (NO in step S16), the CPU 13 increases the number of cycles, which is synchronized with the read pulse for reading the electronic signal, of a frequency based on the drive frequency of the CCD 3 corresponding to the obtained output level of the external ranging device 14 (step S18). For this purpose, the CPU 13 executes mask processes for a predetermined cycle of the read pulse output from the TG 17. Accordingly, a cycle of the read pulse is made slower and the frequency of the read pulse is lowered. The CPU 13 changes the number of cycles of the drive frequency of CCD 3 based on the drive frequency of the apparatus. If the CPU 13 can not determine that the output level of the external ranging device 14 due to an excessively small level, the CPU 13 executes mask processes to be the lowest frequency of the read pulse.

If the frequency of the read pulse is lowered, the CPU 13 outputs the electronic shutter corresponding to an interval (frequency) of the read pulse (step S19). Accordingly, the CPU 13 removes the electric charges from solarization pixels in the CCD 3.

If the frequency of the read pulse is lowered, the CPU 13 adjusts the gain of an electronic signal from the CCD 3 corresponding to an interval (frequency) of the read pulse (step S20).

In step S23, the CPU 13 determines whether the monitoring process is ended. The CPU 13 ends the monitoring when the CPU 13 determines that the monitoring process is ended by the user's operation or a battery shutoff etc. (YES in step S23). The CPU 13 continues the monitoring process when the CPU 13 determine that the monitoring process is not ended (NO in step S23).

Additionally, the control program may be recorded on an optical disc such as a CD-ROM or a magnetic disc such as a hard disc. In this instance, the program may be installed on the ROM 19 through the Internet or a personal computer, for example.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

The entire disclosures of Japanese Patent Applications Nos. 2002-073,784 and 2002-344,311, filed Mar. 18, 2002 and Nov. 27, 2002, respectively, are incorporated herein by reference.

The invention claimed is:

1. An image pickup apparatus comprising:
   an image pickup device configured to convert a monitored object image into an electrical image signal and to output the image signal;
   a processor configured to receive the image signal from the image pickup device and to generate a first brightness signal based on the received image signal;
   a clock generator configured to generate a constant cyclic drive frequency to drive the image pickup device;
   a brightness signal determining unit configured to determine whether the first brightness signal is less than a predetermined value;
   an external ranging device configured to determine a distance to the monitored object and to output a second brightness signal based on a brightness of the monitored object, a sensitivity to light of the external ranging device being higher than that of the image pickup device;
   an image signal reading unit configured to synchronize the image signal with a frequency based on the drive frequency and to read the image signal in a constant read frequency;
   a brightness signal obtaining unit configured to obtain the second brightness signal of the object from the external ranging device, when the brightness signal determining unit determines that the first brightness signal is less than the predetermined value; and
   a read frequency changing unit configured to change the read frequency based on the second brightness signal output by the external ranging device.

2. The image pickup apparatus according to claim 1, wherein the read frequency changing unit changes the drive frequency to change the read frequency.

3. The image pickup apparatus according to claim 1, wherein the read frequency changing unit changes a number of cycles of the read frequency based on the drive frequency, the number of cycles being synchronized with the read frequency.

4. The image pickup apparatus according to claim 1, wherein the external ranging device includes a light exposure obtaining unit configured to obtain a light exposure value of the object, and
   wherein the read frequency changing unit lowers the read frequency if the light exposure value is equal to or less than a predetermined exposure value.

5. The image pickup apparatus according to claim 1, wherein the read frequency changing unit lowers the read frequency if the second brightness signal is not an appropriate level.

6. The image pickup apparatus according to claim 5, wherein the appropriate level is an output level of the second brightness signal corresponding to a light exposure value of the object, wherein the light exposure value is more than a predetermined exposure value.

7. The image pickup apparatus according to claim 1, further comprising:
   an electric charge removing unit configured to remove electric charges from the image pickup device based on the read frequency.

8. The image pickup apparatus according to claim 7, wherein the electric charge removing unit impresses an electronic shutter pulse on an electronic shutter in the image pickup device.

9. The image pickup apparatus according to claim 1, further comprising:
   an automatic gain controlling unit configured to control a gain of the image signal automatically corresponding to the read frequency.

10. The image pickup apparatus according to claim 1, further comprising:
    a CPU configured to prohibit changing the read frequency of the image signal by the read frequency changing unit when the second brightness signal is greater than the predetermined value.

11. An image pickup method comprising:
    converting, via an image pickup device, a monitored object image into an electrical image signal and outputting the image signal;
    receiving the image signal from the image pickup device and generating a first brightness signal based on the received image signal;
    generating a constant cyclic drive frequency to drive the image pickup device;
    determining whether the first brightness signal is less than a predetermined value;

outputting a second brightness signal, via an external ranging device that determines both the second brightness signal and a range to the monitored object, based on a brightness of the monitored object, in which a sensitivity to light of the external ranging device is higher than that of the image pickup device;

synchronizing the image signal with a frequency based on the drive frequency and reading the image signal in a constant read frequency;

obtaining the second brightness signal of the object from the outputting step, when the first brightness signal is determined to be less than the predetermined value in the determining step; and changing the read frequency based on the second brightness signal output by the outputting step.

12. The image pickup method according to claim 11, wherein the changing step changes the drive frequency to change the read frequency.

13. The image pickup method according to claim 11, wherein the changing step changes a number of cycles of the read frequency based on the drive frequency, the number of cycles being synchronized with the read frequency.

14. The image pickup method according to claim 11, wherein the outputting step obtains a light exposure value of the object, and
wherein the changing step lowers the read frequency if the light exposure value is equal to or less than a predetermined exposure value.

15. The image pickup method according to claim 11, wherein the changing step lowers the read frequency if the second brightness signal is not an appropriate level.

16. The image pickup method according to claim 15, wherein the appropriate level is an output level of the second brightness signal corresponding to a light exposure value of the object, wherein the light exposure value is more than a predetermined exposure value.

17. The image pickup method according to claim 11, further comprising:
removing electric charges from the image pickup device based on the read frequency.

18. The image pickup method according to claim 17, wherein the removing step impresses an electronic shutter pulse on an electronic shutter in the image pickup device.

19. The image pickup method according to claim 11, further comprising:
controlling a gain of the image signal automatically corresponding to the read frequency.

20. The image pickup method according to claim 11, further comprising:
prohibiting the read frequency of the image signal to be changed by the changing step when the second brightness signal is greater than the predetermined value.

21. An image pickup system comprising:
means for converting a monitored object image into an electrical image signal and for outputting the image signal;
means for receiving the image signal and generating a first brightness signal based on the received image signal;
means for generating a constant cyclic drive frequency to drive the means for converting;
means for determining whether the first brightness signal is less than a predetermined value;
means for outputting a second brightness signal, via an external ranging device that determines both the second brightness signal and a range to the monitored object, based on a brightness of the monitored object, a sensitivity to light of the means for outputting being higher than that of the means for converting;
means for synchronizing the image signal with a frequency based on the drive frequency and for reading the image signal in a constant read frequency;
means for obtaining the second brightness signal of the object from the means for outputting, when the first brightness signal is determined to be less than the predetermined value; and
means for changing the read frequency based on the second brightness signal output by the means for outputting.

22. The image pickup system according to claim 21, wherein the means for changing changes the drive frequency to change the read frequency.

23. The image pickup system according to claim 21, wherein the means for changing changes a number of cycles of the read frequency based on the drive frequency, the number of cycles being synchronized with the read frequency.

24. The image pickup system according to claim 21, wherein the means for outputting obtains a light exposure value of the object, and
wherein the means for changing lowers the read frequency if the light exposure value is equal to or less than a predetermined exposure value.

25. The image pickup system according to claim 21, wherein the means for changing lowers the read frequency if the second brightness signal is not an appropriate level.

26. The image pickup system according to claim 25, wherein the appropriate level is an output level of the second brightness signal corresponding to a light exposure value of the object, wherein the light exposure value is more than a predetermined exposure value.

27. The image pickup system according to claim 21, further comprising:
means for removing electric charges from the means for converting based on the read frequency.

28. The image pickup system according to claim 27, wherein the means for removing impresses an electronic shutter pulse on an electronic shutter in the image pickup device.

29. The image pickup system according to claim 21, further comprising:
means for controlling a gain of the image signal automatically corresponding to the read frequency.

30. The image pickup system according to claim 21, further comprising:
means for prohibiting changing the read frequency of the image signal by the means for changing when the second brightness signal is greater than a the predetermined value.

31. A computer program product including a computer readable medium storing computer codes for causing a computer to control an image pickup apparatus, comprising:
a first computer code configured to control an image pickup device to convert a monitored object image into an electrical image signal and to output the image signal;
a second computer code configured to receive the image signal from the image pickup device and generate a first brightness signal based on the received image signal;
a third computer code configured to generate a constant cyclic drive frequency to drive the image pickup device;

a fourth computer code configured to determine whether the first brightness signal is less than a predetermined value;

a fifth computer code configured to control an external ranging device configured to determine a distance to the mounted object and to output a second brightness signal based on a brightness of the monitored object, a sensitivity to light of the external ranging device being higher than that of the image pickup device;

a sixth computer code configured to synchronize the image signal with a frequency based on the drive frequency and to read the image signal in a constant read frequency;

a seventh computer code configured to obtain the second brightness signal of the object from the fifth computer code, when the fourth computer code determines that the first brightness signal is less than the predetermined value; and an eighth computer code configured to change the read frequency based on the second brightness signal output by the fifth computer code.

32. The computer program product according to claim 31, wherein the eighth computer code changes the drive frequency to change the read frequency.

33. The computer program product according to claim 31, wherein the eighth computer code changes a number of cycles of the read frequency based on the drive frequency, the number of cycles being synchronized with the read frequency.

34. The computer program product according to claim 31, wherein the external ranging device includes a light exposure obtaining unit configured to obtain a light exposure value of the object, and wherein the eighth computer code lowers the read frequency if the light exposure value is equal to or less than a predetermined exposure value.

35. The computer program product according to claim 31, wherein the eighth computer code lowers the read frequency if the second brightness signal is not an appropriate level.

36. The computer program product according to claim 35, wherein the appropriate level is an output level of the second brightness signal corresponding to a light exposure value of the object, wherein the light exposure value is more than a predetermined exposure value.

37. The computer program product according to claim 31, further comprising:

a ninth computer code configured to control an electric charge removing unit to remove electric charges from the image pickup device based on the read frequency.

38. The computer program product according to claim 37, wherein the electric charge removing unit impresses an electronic shutter pulse on an electronic shutter in the image pickup device.

39. The computer program product according to claim 31, further comprising:

a ninth computer code configured to control a gain of the image signal automatically corresponding to the read frequency.

40. The computer program product according to claim 31, further comprising:

a ninth computer code configured to prohibit changing the read frequency of the image signal by the read frequency changing unit when the second brightness signal is greater than the predetermined value.

* * * * *